United States Patent [19]
Meyer et al.

[11] 4,092,907
[45] June 6, 1978

[54] OUTLET NOZZLE FOR HEATING AND VENTING SYSTEMS OF AUTOMOBILES

[75] Inventors: Ernst Meyer, Oberursel, Taunus; Hans Trube, Sindelfingen; Hermann Grimm, Ostelsheim, all of Germany

[73] Assignee: Daimler-Benz Aktiengesellschaft, Stuttgart, Unterturkheim, Germany

[21] Appl. No.: 818,770

[22] Filed: Jul. 25, 1977

Related U.S. Application Data

[63] Continuation of Ser. No. 611,431, Sep. 8, 1975, abandoned.

[30] Foreign Application Priority Data

Sep. 7, 1974 Germany .............................. 2442946

[51] Int. Cl.² ........................ F24F 13/06; F24F 13/10
[52] U.S. Cl. .................................. 98/40 A; 98/41 R; 251/352
[58] Field of Search ............... 98/2, 40 A, 41 R, 40 N; 251/352, 248, 250.5; 137/601; 239/587, 569

[56] References Cited

U.S. PATENT DOCUMENTS

| 2,672,806 | 3/1954 | Vehige | 98/41 R |
|---|---|---|---|
| 2,830,523 | 4/1958 | Vehige | 98/40 A |
| 3,010,381 | 11/1961 | Glass | 98/41 R |
| 3,186,329 | 6/1965 | Kennedy | 98/40 A |
| 3,366,363 | 1/1968 | Hogan et al. | 98/40 A |
| 3,420,448 | 1/1969 | Snow | 98/41 A |
| 3,802,328 | 4/1974 | Kakizaki | 98/40 A |
| 3,835,759 | 9/1974 | Lloyd | 98/40 A |
| 4,006,673 | 2/1977 | Meyer et al. | 98/40 A |

*Primary Examiner*—Lloyd L. King
*Attorney, Agent, or Firm*—Joseph A. Geiger

[57] ABSTRACT

An adjustable outlet nozzle for heating and venting systems of automobiles having a double-wing butterfly valve arranged inside a convex-spherically shaped ring which is universally pivotably supported by a concave-spherically shaped connector housing, the wing flaps of the valve being actuatable by means of a rotatable cross handle and a bevel gear drive, the flanks of the cross handle being axially aligned with a transverse supporting member and with the fully open wing flaps of the valve, to form a smooth air guide through the nozzle.

9 Claims, 4 Drawing Figures

OUTLET NOZZLE FOR HEATING AND VENTING SYSTEMS OF AUTOMOBILES

CROSS REFERENCE TO RELATED APPLICATION

This application is a continuation of our copending application, Ser. No. 611,431, filed Sept. 8, 1975, now abandoned.

BACKGROUND OF THE INVENTION

1. Field of the Invention

The present invention relates to an outlet nozzle for heating and venting systems in automotive vehicles.

2. Description of the Prior Art

Heating and venting systems in automotive vehicles have several air outlet openings at different places in the passenger compartment, of which the outlets which are normally positioned at the two extremities of the dashboard are equipped with an adjustable outlet nozzle for controlling the volume and direction of the air stream. A known adjustable nozzle of this type consists essentially of a shaped ring whose outer surface has the shape of a sector of a sphere, and which is supported in a universally pivotable manner inside a supporting connector housing with a matching concave-spherical inner contour, using an intermediate sealing and sliding member of textile material, preferably felt, the connector housing serving for the attachment of the nozzle to the dashboard. Inside the shaped ring is arranged a double-wing butterfly valve having two wing flaps arranged on a common rotational axis and being actuatable by means of a control member, via a gear segment drive. In the known outlet nozzle, the control member is a knurled knob which is supported directly, or through its control pin, in a transverse supporting member extending across the opening of the spherical ring.

The known outlet nozzle has proved itself generally acceptable. However, it has the disadvantage that the knurled knob, in order to be easily rotatable, has to have a large minimum diameter, with the consequent need for the knob-journalling transverse supporting member to be of a comparably large diameter, resulting not only in a proportionate reduction of the flow cross section available, but also creating an undesirable disruption and turbulence in the air stream.

SUMMARY OF THE INVENTION

It is an objective of the present invention to create an air outlet nozzle of the type mentioned above which makes possible the discharge of a compact air jet. The invention consists in that the control member takes the form of a cross handle which is journalled in a transverse supporting member whose axial contour matches the inner contour of the cross handle.

The shaping of the control member in the form of a cross handle, rather than a knurled knob, causes the air stream to be quartered through the four channels formed by the spherical ring and the cross handle, so that, in their end positions, the completely open flaps of the butterfly valve align themselves with the transverse support member and with one pair of arms of the cross member into cooperating aligned air guide surfaces. Because of the considerably greater ease with which the cross handle can be rotated as compared with the knurled knob, it becomes possible, on the one hand, to make the arms of the cross handle so narrow that they no longer impede the air stream, while, on the other hand, the matching contours of the cross handle and of the transverse support member, when angularly aligned, provide uninterrupted air guiding surfaces, where cross currents are prevented. In summary, the present invention makes it possible to obtain a larger flow cross section with a more compact air guide, without increasing the overall space requirements. To the foregoing is added the additional advantage that the cross-handle-type control member makes it possible to combine the drive gear of the gear segment drive with the cross handle, so as to be produceable integrally as a single injection-molded part, thereby not only stabilizing the structure, but additionally saving an operational step in the assembly of the control member. An additional considerable advantage over the known outlet nozzle consists in the fact that the cross handle can be operated by simply pulling it with one finger.

The transverse supporting member and the shaft of the butterfly valve are preferably arranged in parallel, and the configuration of the drive gears is preferably such that, when the wing flaps of the valve are in their fully open position, one pair of arms of the cross handle is positioned in axial alignment with the transverse supporting member, whereby the drive ratio between the gear drive and the wing flaps is appropriately so related to the angular motion of the latter that the complete opening displacement of the wing flaps corresponds to a rotation of the cross handle over an angle of 90°. Assuming an angular displacement of the wing flaps of 65° between their fully closed and fully open positions, a drive ratio between the gears of the gear segment drive of 1 to 1.32 would achieve this result.

The mounting of the wing flaps, which form a subassembly in the present invention, may be in a known configuration in which the valve shaft is fixedly clamped to the wall of the spherical ring by means of axially oriented threaded connections. It is preferable, however, to manufacture the spherical ring as a split ring, whereby the valve shaft is journalled in a mounting ring which is enclosed axially between the two halves of the spherical ring inside a groove of the latter. The dimensional relationships are preferably such that the mounting ring protrudes radially inwardly a short distance from the spherical ring, and that the arms of the cross handle are supported against the side of the mounting ring. The result is not only a simplification of the manufacture and assembly of the outlet nozzle, but also a support for the cross handle against transversely oriented forces, so that its bearing connection is protected from undue forces, with the result that the thickness of the transverse supporting member and of the arms of the cross handle may be further reduced without risk.

BRIEF DESCRIPTION OF THE DRAWINGS

The invention is illustrated in the drawings, by way of examples, the several figures showing the following.

DESCRIPTION OF THE PREFERRED EMBODIMENTS

Figure 1:
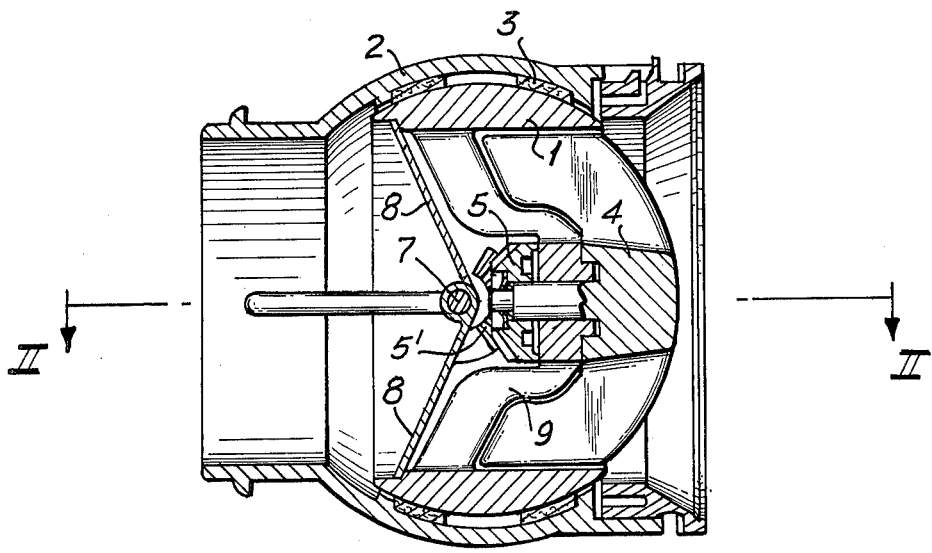
FIG. 1 is a cross section of an outlet nozzle for heating and venting systems, in accordance with the present invention.
Figure 2:
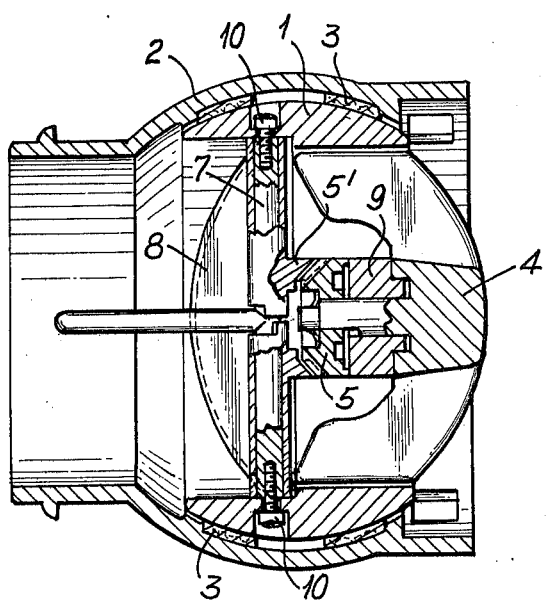
FIG. 2 is a cross section along line A—A of FIG. 1.

In FIGS. 1 and 2 of the drawing is indicated at 1 the spherical ring of an outlet nozzle which is supported in a universally pivotable manner inside a matching concave-spherical seat of a supporting connector housing, through the intermediate of the sealing and sliding member 3. The connector housing 2 serves for the mounting of the outlet nozzle on the dashboard. At the inside of the spherical ring 1 is arranged a control member 4 and a double-wing butterfly valve 8 supported on a shaft 7 and operatively engaged by the control member 4 through a gear segment drive 5, 5'.

According to the present invention, the control member 4 has the shape of a cross handle which is rotatably supported in a journal which is part of a transverse supporting member 9 of the spherical ring 1, the supporting member having an outer axial contour corresponding to the inner contour of the cross handle, as shown in FIG. 1. The example shown features a spherical ring 1 which is made of one piece and a butterfly valve axis which is held in place inside the outlet nozzle by means of self-tapping screws 10 engaging the valve shaft through the wall of the spherical ring 1. The valve shaft 7 and the transverse supporting member 9 are angularly offset from each other by 90°, so that, when the wing flaps of the butterfly valve 8 are in their fully open position, the flaps and one arm of the cross handle are in axial alignment, on the one hand, and the transverse supporting member 9 and the other arm of the cross handle are likewise aligned, on the other hand, thereby forming air guide surfaces. The latter may additionally be shaped to produce a deflecting effect inside the outlet nozzle.

Figure 3:
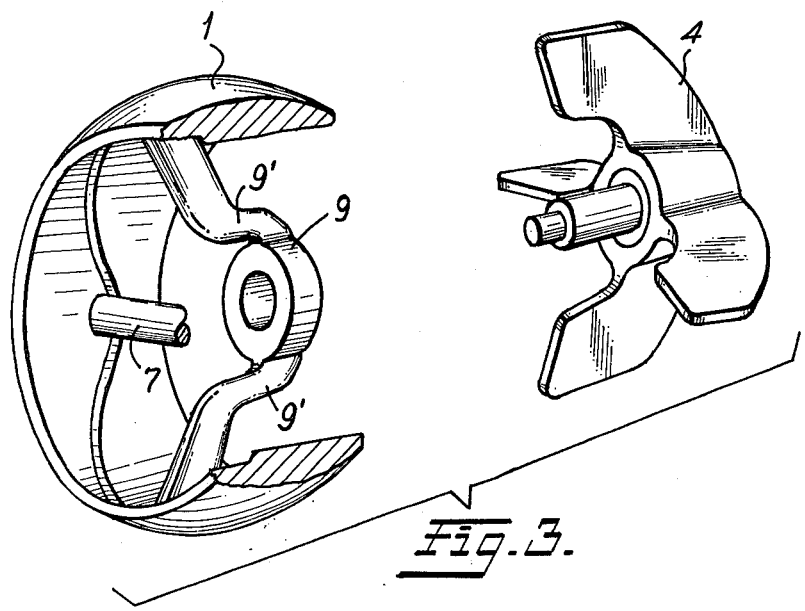
FIG. 3 shows a second embodiment of the outlet nozzle of the invention.
Figure 4:
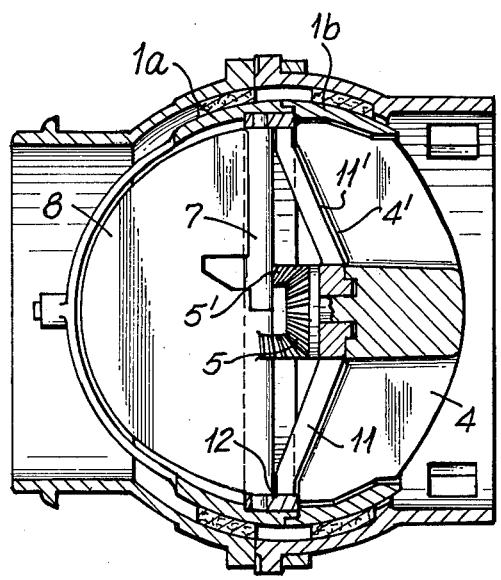

In FIG. 3 is shown a particularly advantageous embodiment of the invention, where parts which are the same as parts of the embodiment of FIGS. 1 and 2 also have the same reference numerals. In this embodiment, the transverse supporting member 11 and the butterfly valve shaft 7 are arranged in parallel alignment, while the contours 11' and 4' of the transverse supporting member 11 and of the cross handle 4, respectively, are again matched. The fully open nozzle thus presents an uninterrupted air guiding surface, constituted by the aligned wing flaps 8, transverse member 11, and one of the two arms of the cross handle, without creating any air deflections or air turbulence. Furthermore, the spherical ring is composed of two ring halves 1a and 1b, which define a groove between them for the clamping of a mounting ring 12. The dimensions of this configuration are preferably such that the mounting ring 12 protrudes a short distance radially inwardly from the spherical ring 1, so that the free extremities of the arms of the cross handle 4 will come to rest against the mounting ring 12. This arrangement not only simplifies the manufacture and assembly of the nozzle, it also provides an additional support for the cross handle 4 against transverse forces and against bending moments acting on its bearing support, especially when the latter is rotated by pulling on a cross handle arm with only one finger.

It should be understood, of course, that the foregoing disclosure describes only preferred embodiments of the invention and that it is intended to cover all changes and modifications of these examples of the invention which fall within the scope of the appended claims.

We claim:

1. An adjustable air outlet nozzle especially suited for heating and venting or air-conditioning systems of automotive vehicles and comprising: a generally tubular stationary connector housing attachable to the end of an air duct, the housing having an enlarged central length portion defining a lodgement with an inner guide surface of hollow-spherical contour; a spherical ring whose outer surface is shaped after a bilaterally truncated sphere and which is supported in a universally pivotable manner inside said connector housing lodgement; a double-wing butterfly valve arranged inside the spherical ring on the upstream side thereof, the valve having two wing flaps arranged on a common pivot shaft which extends transversely across the inner diameter of the ring, the two wing flaps carrying bevel gear segments cooperating with a common drive bevel gear arranged in the center axis of the nozzle and journalled for rotation inside a transverse supporting member of the spherical ring; and a manually operable control member arranged on the downstream side of the spherical ring and attached to the drive bevel gear so as to be carried by the ring and its transverse supporting member, the improvements therein being characterized in that:

the spherical ring is constituted of two halves which are joined in a radial plane near the equator of their spherical shape;

the two ring halves define between them a radially inwardly facing positioning groove;

the transverse supporting member of the spherical ring includes a peripheral mounting ring which is receivable and axially clampable in said positioning groove, and a narrow stem extending radially from side to side of the peripheral mounting ring and having an enlarged hub-like central portion with an axial bore inside which the drive bevel gear and the attached control member are journalled;

the control member has the shape of a cross handle defined by two perpendicularly crossed radial arms extending across the inner width of the spherical ring, said arms being shaped so as to serve as air flow guides, with an axial width several times greater than the circumferential width, the arms having on their upstream side an outline which generally matches the outline of the supporting member stem; and the drive configuration between the control member and the butterfly valve, via said bevel gear drive, is such that the wing flaps of the valve, in their fully open position, are substantially aligned with a central axial plane through the valve pivot shaft and one radial arm of the control member is likewise aligned with said plane, while the stem of the supporting member is similarly axially aligned with one radial arm of the control member, whereby the valve and its pivot shaft define axially aligned air guide surfaces on the upstream side of the nozzle, while the supporting member stem and the radial arm of the control member define similarly aligned air guide surfaces on the downstream side of the nozzle.

2. An air outlet nozzle as defined in claim 1, wherein the gear ratio of said bevel gear drive between the control member and the butterfly valve is such that an angular movement of the wing flaps of the valve from their fully open to their fully closed position is obtained with a control member movement of one-quarter turn.

3. An air outlet nozzle as defined in claim 1, wherein the pivot shaft for the wing flaps of the butterfly valve reaches radially into the mounting ring of the supporting member, the latter having matching bores positioning said shaft.

4. An air outlet nozzle as defined in claim 3, wherein said pivot shaft and the stem of the transverse supporting member have the same angular orientation.

5. An air outlet nozzle as defined in claim 1, wherein
the peripheral mounting ring of said stem defines an annular shoulder facing axially downstream;
the two arms of the control member have upstream facing extremities with which they engage said annular shoulder; and
the bevel gear to which the control member is attached engages the hub-like central portion of said stem on its upstream axial side, thereby axially positioning the bevel gear and control member in relation to said stem.

6. An adjustable air outlet nozzle especially suited for heating and venting or air-conditioning systems of automotive vehicles and comprising: a generally tubular stationary connector housing attachable to the end of an air duct, the housing having an enlarged central length portion defining a lodgement with an inner guide surface of hollow-spherical contour; a spherical ring whose outer surface is shaped after a bilaterally truncated sphere and which is supported in a universally pivotable manner inside said connector housing lodgement; a double-wing butterfly valve arranged inside the spherical ring on the upstream side thereof, the valve having two wing flaps arranged on a common pivot shaft which extends transversely across the inner diameter of the ring, the two wing flaps carrying bevel gear segments cooperating with a common drive bevel gear arranged in the center axis of the nozzle and journalled for rotation inside a transverse supporting member of the spherical ring; and a manually operable control member arranged on the downstream side of the spherical ring and attached to the drive bevel gear so as to be carried by the ring and its transverse supporting member, the improvements therein being characterized in that:
said transverse supporting member is a stem extending diametrally across the inside of the spherical ring and having circumferentially narrow radial stem portions supporting an enlarged central hub portion with an axial bore inside which the drive bevel gear and the attached control member are journalled, the outline of said stem, as seen in a longitudinal cross section therethrough, being such that its central hub portion is offset axially downstream from its radial stem portions;
the control member has at least one radial arm extending diametrally across substantially the entire inner width of the spherical ring, said arm, or arms, respectively, being shaped so as to serve as an air flow guide, having an axial width several times greater than the circumferential width and an axially offset outline on the upstream side which generally follows said offset outline of the radial stem portions of the supporting member, so as to define a small gap therewith; and
the drive configuration between the control member and the butterfly valve, via said bevel gear drive, is such that the wing flaps of the valve, in their fully open position, are substantially aligned with a central axial plane through the valve pivot shaft, while the radial stem portions of the supporting member are axially aligned with a radial arm of the control member, whereby the valve and its pivot shaft define axially aligned air guide surfaces on the upstream side of the nozzle, while the supporting member and the radial arm of the control member define axially aligned air guide surfaces on the downstream side of the nozzle.

7. An air outlet nozzle as defined in claim 6, wherein
the control member has two radial arms intersecting each other at right angles; and
the supporting member is circumferentially so oriented with respect to the valve pivot shaft, that an axial plane through the one is perpendicular to an axial plane through the other, so that, in the fully open valve position, one radial arm of the control member is axially aligned with said shaft and with the flaps of the control valve, while the other radial arm is axially aligned with the supporting member.

8. An air outlet nozzle as defined in claim 7, wherein the gear ratio of said bevel gear drive between the control member and the butterfly valve is such that an angular movement of the wing flaps of the valve from their fully open to their fully closed position is obtained with a control member movement of one-quarter turn.

9. An air outlet nozzle as defined in claim 7, wherein
the supporting member is an integral extension of the spherical ring; and
the valve pivot shaft, extending likewise diametrally across the inside of the spherical ring, is attached to the latter by means of fasteners which reach radially inwardly through the ring.

* * * * *